United States Patent
Stoyke (10) Patent No.: US 10,409,258 B2
(45) Date of Patent: Sep. 10, 2019

(54) METHOD FOR COMPENSATING FOR A DEVIATION IN AN OPERATING POINT

(71) Applicant: Broetje-Automation GmbH, Rastede (DE)

(72) Inventor: Markus Stoyke, Friesoythe (DE)

(73) Assignee: Broetje-Automation GmbH, Rastede (DE)

( * ) Notice: Subject to any disclaimer, the term of this patent is extended or adjusted under 35 U.S.C. 154(b) by 137 days.

(21) Appl. No.: 15/540,633

(22) PCT Filed: Dec. 22, 2015

(86) PCT No.: PCT/EP2015/080945
§ 371 (c)(1),
(2) Date: Nov. 1, 2017

(87) PCT Pub. No.: WO2016/107787
PCT Pub. Date: Jul. 7, 2016

(65) Prior Publication Data
US 2017/0357239 A1   Dec. 14, 2017

(30) Foreign Application Priority Data
Dec. 29, 2014   (DE) .......................... 10 2014 119 654

(51) Int. Cl.
*G05B 19/404*   (2006.01)
*B23Q 15/18*   (2006.01)

(52) U.S. Cl.
CPC .......... *G05B 19/404* (2013.01); *B23Q 15/18* (2013.01); *G05B 2219/41443* (2013.01); *G05B 2219/49206* (2013.01)

(58) Field of Classification Search
None
See application file for complete search history.

(56) References Cited

U.S. PATENT DOCUMENTS

| 4,594,670 A | 6/1986 | Itoh |
| 4,906,908 A * | 3/1990 | Papiernik ............ G05B 19/186 318/600 |

(Continued)

FOREIGN PATENT DOCUMENTS

| DE | 3406255 | 9/1984 |
| DE | 2508968 | 9/1986 |

(Continued)

OTHER PUBLICATIONS

"German Search Report," for Priority Application No. DE102010119654.6 dated Oct. 21, 2015 (8 pages).

(Continued)

*Primary Examiner* — Ramesh B Patel
(74) *Attorney, Agent, or Firm* — Pauly, DeVries Smith & Deffner LLC (57) ABSTRACT

Various embodiments relate to compensating for a deviation in an operating point of a manipulator during the processing of a workpiece. A command sequence is processed for controlling the manipulator, and a piece of setpoint position information is generated. The operating point is set based on the setpoint position information. The setpoint position information is processed using a compensation parameter set for ascertaining a compensation value. The setpoint position information is adjusted according to the compensation value for compensating for a deviation between an actual position of the operating point and the setpoint position. The actual position is measured during the processing of the workpiece. A correction value is ascertained, based on a comparison between the measured actual position and the setpoint position. The compensation parameter set is adjusted during the processing of the workpiece for reducing the deviation based on the correction value.

20 Claims, 2 Drawing Sheets

(56) References Cited

U.S. PATENT DOCUMENTS

| | | | | |
|---|---|---|---|---|
| 5,133,047 | A * | 7/1992 | Hariki | G05B 19/4182 700/262 |
| 5,187,418 | A * | 2/1993 | Minami | B25J 9/1643 318/567 |
| 5,189,351 | A * | 2/1993 | Torii | B25J 9/1692 318/568.19 |
| 5,241,249 | A * | 8/1993 | Detriche | B25J 9/1664 318/568.11 |
| 5,274,213 | A * | 12/1993 | Sartorio | B23K 9/12 219/124.34 |
| 5,469,531 | A * | 11/1995 | Faure | B25J 9/1015 700/251 |
| 5,721,477 | A * | 2/1998 | Sepehri | B25J 9/1628 318/610 |
| 6,775,897 | B2 * | 8/2004 | Wolf | B21J 15/14 29/281.1 |
| 7,130,718 | B2 * | 10/2006 | Gunnarsson | B25J 9/1638 700/254 |
| 8,706,302 | B2 * | 4/2014 | Eickhorst | B25J 9/1676 700/264 |
| 2004/0093119 | A1 * | 5/2004 | Gunnarsson | B25J 9/1638 700/245 |
| 2006/0021348 | A1 * | 2/2006 | Neumann | F15B 15/088 60/716 |
| 2011/0286827 | A1 * | 11/2011 | Givens | B66C 23/005 414/626 |
| 2014/0324219 | A1 * | 10/2014 | Dumora | B25J 9/1679 700/258 |

FOREIGN PATENT DOCUMENTS

| | | |
|---|---|---|
| DE | 3614122 | 11/1987 |
| DE | 3724428 | 2/1989 |
| DE | 4031057 | 4/1991 |
| DE | 4111354 | 10/1992 |
| DE | 19821873 | 11/1999 |
| DE | 19826395 | 12/1999 |
| DE | 10302592 | 7/2004 |
| DE | 102004026185 | 12/2005 |
| DE | 102007050232 | 4/2009 |
| DE | 102010003303 | 9/2011 |
| DE | 102011011542 | 8/2012 |
| EP | 0513417 | 11/1992 |
| WO | 2016107787 | 7/2016 |

OTHER PUBLICATIONS

"International Preliminary Report on Patentability," for corresponding PCT Application No. PCT/EP2015/080945 dated Jul. 4, 2017 (7 pages).

"International Search Report and Written Opinion," for corresponding PCT Application No. PCT/EP2015/080945 dated Apr. 7, 2016 (7 pages).

* cited by examiner

METHOD FOR COMPENSATING FOR A DEVIATION IN AN OPERATING POINT

CROSS-REFERENCE TO RELATED APPLICATIONS

This application is a national stage application under 35 U.S.C. 371 of International Patent Application Serial No. PCT/EP2015/080945, entitled "Method for Compensating for a Deviation in an Operating Point," filed Dec. 22, 2015, which claims priority from German Patent Application No. DE 10 2014 119 654.6, filed Dec. 29, 2014, the disclosure of which is incorporated herein by reference.

FIELD OF THE TECHNOLOGY

The present disclosure relates to a method for compensating for a deviation in an operating point of a manipulator.

BACKGROUND

When processing workpieces by means of an end effector on a manipulator, it is frequently required to continually move and thus position the operating point, which may also be referred to as the tool center point (TCP), of the manipulator during the machining process. In particular, if the manipulator is a multiaxis robot, the control of the manipulator is based on calculations performed in an NC controller, which include trajectory planning and interpolation, according to which the corresponding controls, for example, of the axes of the multiaxis robot, take place.

The calculations performed by the NC controller are based on various physical parameters of the manipulator, for example, lengths, weights, and other variables which are relevant to the calculations. However, in practice, these parameters are not ideally constant, but may change, for example, as a function of the instantane-ously prevailing temperature. If these changes are not taken into account when controlling the manipulator, a deviation results between the actual position of the operating point of the manipulator and the setpoint position of the operating point of the manipulator according to the calculation. Here and below, the term "NC controller" is to be understood in the broad sense, thus meaning a controller which comprises some or all functionalities of a PLC (programmable logic controller).

A method and a device for compensating for a temperature-dependent change in position on a machine tool is known from the related art and specifically from the published patent application DE 10 2010 003 303 A1. Here, an NC controller cal-culates setpoint values for various linear axes of the machine tool. These setpoint values take into account a temperature compensation which is based on instanta-neous temperature measurements and which ascertains a compensation value for the individual setpoint values of the respective linear axes and applies it to them. However, the compensation values are not only temperature-dependent; they also depend on the position of the linear axes. Thus, it is also taken into account that for precise temperature compensation, a position-dependent component must also be taken into account. To be able to perform the compensation in a timely manner specifically in the case of rapid changes in position, the compensation is determined via a system of fixed coefficients, which are applied to the measured temperatures and the axis positions, according to the determination via the NC controller.

However, the related art has the disadvantage that, despite the attempt to compensate by taking into account the temperature, whether as a function of position or independently of position, a deviation may result between the setpoint position and the actual position. This may be because the prevailing boundary conditions, for example, during an initial calibration carried out simultaneously in the laboratory for ascertaining the above coefficients, no longer exist. Thus, for instance, a specific temperature distribution may exist along a route of the manipulator, which cannot be sufficiently differentiated even by means of multiple distributed temperature sensors; or process forces acting on the manipulator may generate a significant influence on the position of the manipulator. Deviations which have their cause herein cannot be compensated for under the approach from the related art.

SUMMARY

Against this background, an object of the present disclosure is to provide an improved method for compensating for a deviation in an operating point of a manipulator during the processing of a workpiece via an end effector on the manipulator, said method being able to respond dynamically, via compensation, to deviation effects occurring during the processing.

The aforementioned problem is solved via a method for compensating for a deviation in an operating point of a manipulator according to the disclosure.

In various embodiments, by measuring the actual position of the operating point during the processing of the workpiece, and thus after compensation has been performed, the compensation parameters may be dynamically adjusted in the case of a deviation which still exists, so that both disturbance variables which are not known beforehand and changing relationships of the known disturbance variables may be taken into account and compensated for. In this respect, feedback takes place in real time for improving the compensation parameters.

In this case, various embodiments relate to the possibility of carrying out this adjustment of the compensation parameters in the interval in which the NC controller carries out the interpolation. This enables a very rapid response to deviations which occur.

NC controllers exist which provide special programmer interfaces via which proprietary software modules which are defined, for example, by operators of the NC controller or integrators, can intervene into the processing of the NC controllers. Some embodiments provide for allowing steps of the provided method to run in an extension software module which interacts with the NC controller via such an interface. In this case, this extension software module may be called or initiated via this interface and may for its part access state information about the NC controller or trigger actions of the NC controller.

An option for measuring the actual position in the ongoing processing is provided via the provision of an optical sensor as a laser tracker, as described herein.

Various embodiments provide for an additional refinement, according to which the parameters used for compensation are subdivided to the extent that only certain parameters are dynamically adjusted, and the remaining parameters remain constant. In this way, a more precise depiction of the physical effects underlying the deviation is possible.

Various embodiments relate to the measurement of an environmental variable as the basis for the compensation, wherein some embodiments specifically provide for taking into account a pressure as an environmental variable for the compensation, and this pressure may act specifically on a weight compensation system and may be measured there. Some embodiments relate to the measurement of an actual temperature as the environmental variable and compensation for temperature-related deviations. An embodiment in turn provides for detection of a process force acting on the end effector for compensating for corresponding effects.

Additional embodiments relate to the case in which the manipulator is a multiaxis robot, and specifically to embodiments tailored to this variant.

An embodiment provides a method for compensating for a deviation in an operating point of a manipulator during the processing of a workpiece via an end effector on the manipulator; wherein a command sequence is processed for controlling the manipulator for the purpose of processing the workpiece, and a piece of setpoint position information corresponding to a setpoint position is generated based on the command sequence, the operating point of the manipulator being set based on said piece of setpoint position information; wherein the piece of setpoint position information is processed using a compensation parameter set which is related to the piece of setpoint position information, for ascertaining a compensation value, and the piece of setpoint position information is adjusted according to the compensation value for compensating for a deviation between an actual position of the operating point and the setpoint position; wherein the actual position is measured during the processing of the workpiece; in that a correction value is ascertained, based on a comparison between the measured actual position and the setpoint position; and in that the compensation parameter set is adjusted during the processing of the workpiece for reducing the deviation, based on the correction value.

In various embodiments, the piece of setpoint position information is generated by an NC controller, based on the command sequence, in particular after an interpolation and/or a transformation; such as the piece of setpoint position information is generated by the NC controller at an interpolation rate; and in that the adjustment of the compensation parameter set for reducing the deviation takes place at the interpolation rate.

In various embodiments, the processing of the piece of setpoint position information using the compensation parameter set related to the piece of setpoint position information for ascertaining a compensation value, and the adjustment of the compensation parameter set for reducing the deviation, take place in a running extension software module, said extension software module communicating in terms of data technology with the NC controller via a connection interface of said NC controller.

In various embodiments, the connection interface calls the extension software module in terms of data technology based on execution events of the NC controller.

In various embodiments, the extension software module receives state information about the manipulator, in particular comprising the actual position and/or the piece of setpoint position information and/or the setpoint position, via the connection interface.

In various embodiments, during the processing of the workpiece, the actual position is measured via an optical position sensor, in particular a laser tracker; such as the optical position sensor is connected in terms of data technology to the NC controller and/or to the extension software module via running measuring software.

In various embodiments, the compensation parameter set comprises an in particular manipulator type-related model parameter set and a physical data set, such as comprising mass information and/or center of mass information relating to the manipulator; and in that furthermore, in particular only the model parameter set is adjusted based on the correction value for reducing the deviation.

In various embodiments, during the processing of the workpiece, at least one environmental variable is measured; and in that the compensation parameter set comprises an environmental compensation parameter which is related to the respective measured environmental variable, the respective measured environmental variable being processed using said environmental compensation parameter for ascertaining the compensation value.

In various embodiments, the at least one environmental variable comprises a pressure, such as, a pressure acting on the manipulator, in particular acting on a weight compensation system of the manipulator.

In various embodiments, the at least one environmental variable comprises an actual temperature, such as, an actual temperature at the manipulator; in particular in that the actual temperature is influenced by ambient heat and by self-heating of the manipulator.

In various embodiments, the environmental compensation parameter comprises a material-dependent temperature expansion coefficient and/or an in particular axis-related temperature-deflection coefficient and/or an in particular axis-related length parameter, said environmental compensation parameter being related to the measured actual temperature.

In various embodiments, the at least one environmental variable comprises a process force acting on the manipulator and/or on the end effector.

In various embodiments, the manipulator is a multiaxis robot, such as the piece of setpoint position information comprises a piece of axis information about the multiaxis robot, in particular in that the piece of axis information comprises a piece of setpoint information about a horizontal main axis.

In various embodiments, the compensation parameter set comprises an axis compensation parameter which is related to the piece of axis information, via which the piece of axis information is processed for ascertaining the correction value; such that in particular only the piece of axis information is adjusted via a component of the correction value which derives from the axis compensation parameter.

In various embodiments, the piece of setpoint position information comprises a Cartesian coordinate system, such as the piece of axis information was generated based on the piece of Cartesian coordinate information; in particular in that the compensation parameter set comprises an absolute compensation parameter which is related to the piece of Cartesian coordinate information, via which the piece of Cartesian coordinate information is processed for ascertaining the correction value.

BRIEF DESCRIPTION OF THE DRAWINGS

Additional details, features, objectives, and advantages of the present disclosure will be described below, based on the drawing of only one exemplary embodiment. The following are shown.

DETAILED DESCRIPTION

Figure 1:
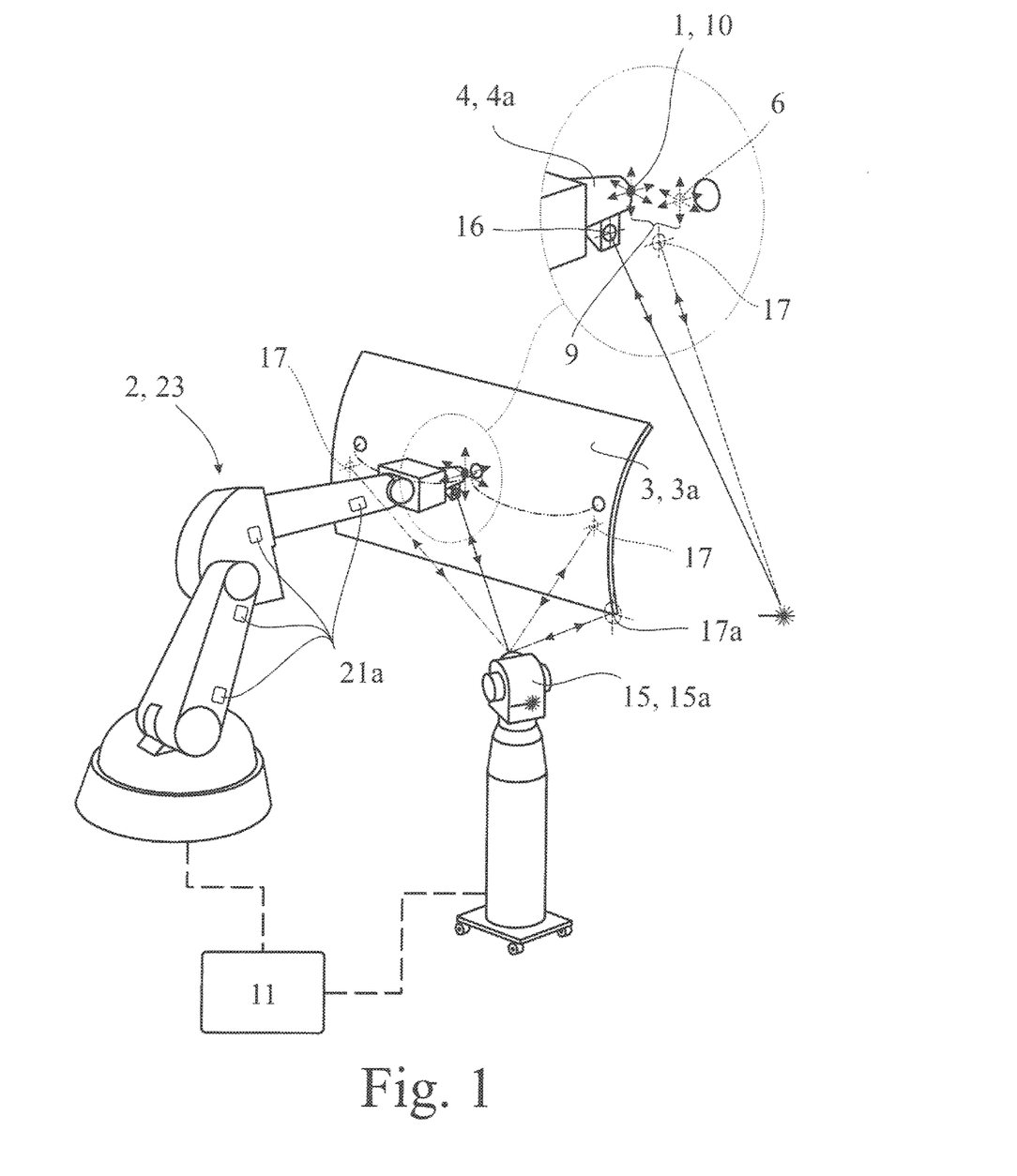
FIG. 1 shows a schematic representation of an arrangement including an end effector on a manipulator for processing a workpiece for carrying out the method according to the proposal.

The method according to the proposal is used for compensating for a deviation in an operating point 1, also referred to as a tool center point (TCP), of a manipulator 2 during the processing of a workpiece 3 via an end effector 4 on the manipulator 2. The corresponding arrangement is depicted in FIG. 1. In the depicted exemplary embodiment, the end effector 4 is a welding device 4a, and the workpiece 3 is an aircraft structural component 3a. In the method according to the proposal, a command sequence is processed for controlling the manipulator 2 for the purpose of processing the workpiece 3. On the one hand, this command sequence may be an NC program which is made up of individual NC commands. However, it may be a command sequence which was first created from the NC commands of the NC program. This creation may comprise various calculation steps, in particular kinematics transformation, interpolation, or trajectory planning. The processing takes place periodically in an NC controller 11a which is further described below.

According to the proposal, a piece of setpoint position information 5 corresponding to a setpoint position 6 is generated based on this command sequence. The setpoint position 6, which is a setpoint position 6 of the operating point 1, thus results from the command sequence, either directly or via one or multiple calculation steps as described above by way of example. The piece of setpoint position information 5 corresponds to the control data which were generated from the processing of the command sequence and via which the manipulator 2 is to be controlled, so that the operating point 1 is at the setpoint position 6. In this case, in addition to a pure position specification in three dimensions, both the operating point 1 and the setpoint position 6 may also comprise an orientation specification, for example, also in three dimensions. A differentiation will be not made below between these two possible components, and possibly additional components, of the operating point 1 or the setpoint position 6. The piece of setpoint position information 5 may accordingly also be a time sequence or a profile of control data via which the manipulator 2 is controlled.

According to the proposal, the operating point 1 of the manipulator 2 is thus set based on the piece of setpoint position information 5. Relationships which are ascertained in advance via measurement, and which establish a deviation of the operating point 1 from the setpoint position 6 as a function of various boundary conditions, are now taken into account for compensation. According to the proposal, for this purpose, it is provided that the piece of setpoint position information 5 is processed using a compensation parameter set 7 which is related to the piece of setpoint position information 5, for ascertaining a compensation value 8. This processing may in principle be any arbitrary calculating operation. According to the proposal, the piece of setpoint position information 5 is adjusted according to the compensation value 8 for compensating for a deviation 9 between an actual position 10 of the operating point 1 and the setpoint position 6. Thus, the compensation value 8 is to reduce this deviation 9 with respect to the situation in which the compensation value 8 is not taken into account, if possible. In this case, the compensation value 8, as well as the piece of setpoint position information 5, may be provided to the manipulator 2, so that this processing takes place in the manipulator 2. The above determinations with respect to the dimensionality of the setpoint position also apply analogously to the actual position 10. Alternatively or in addition, the adjustment of the piece of setpoint position information may also take place in a control device 11 which is separate from the manipulator 2, so that the manipulator 2 is controlled using only the piece of setpoint position information 5 which is adjusted in this sense. This control device 11 may in principle be any arbitrary data processing device and in particular a computer such as an industrial PC or the like.

However, as already described above, here, it may be that this adjustment of the piece of setpoint position information 5 according to the compensation value 8 is not sufficient to completely compensate for the deviation 9. In fact, it regularly happens that not all effects which occur during the processing of the workpiece 3 and which may result in the deviation 9 may be completely detected via a previ-ously ascertained compensation parameter set 7.

The method according to the proposal is therefore characterized in that the actual position 10 is measured during the processing of the workpiece 3; in that a correction value 12 is ascertained, based on a comparison between the measured actual position 10 and the setpoint position 6; and in that the compensation parameter set 7 is adjusted during the processing of the workpiece 3 for reducing the deviation 9, based on the correction value 12. In this way, the mechanism for compensating for the deviation 9 may still be further optimized during the processing of the workpiece 3 in such a way that it may even completely disappear. By adjusting the compensation parameter set 7, the compensation value 8 also changes correspondingly, resulting in a reduction in the deviation 9.

Figure 2:
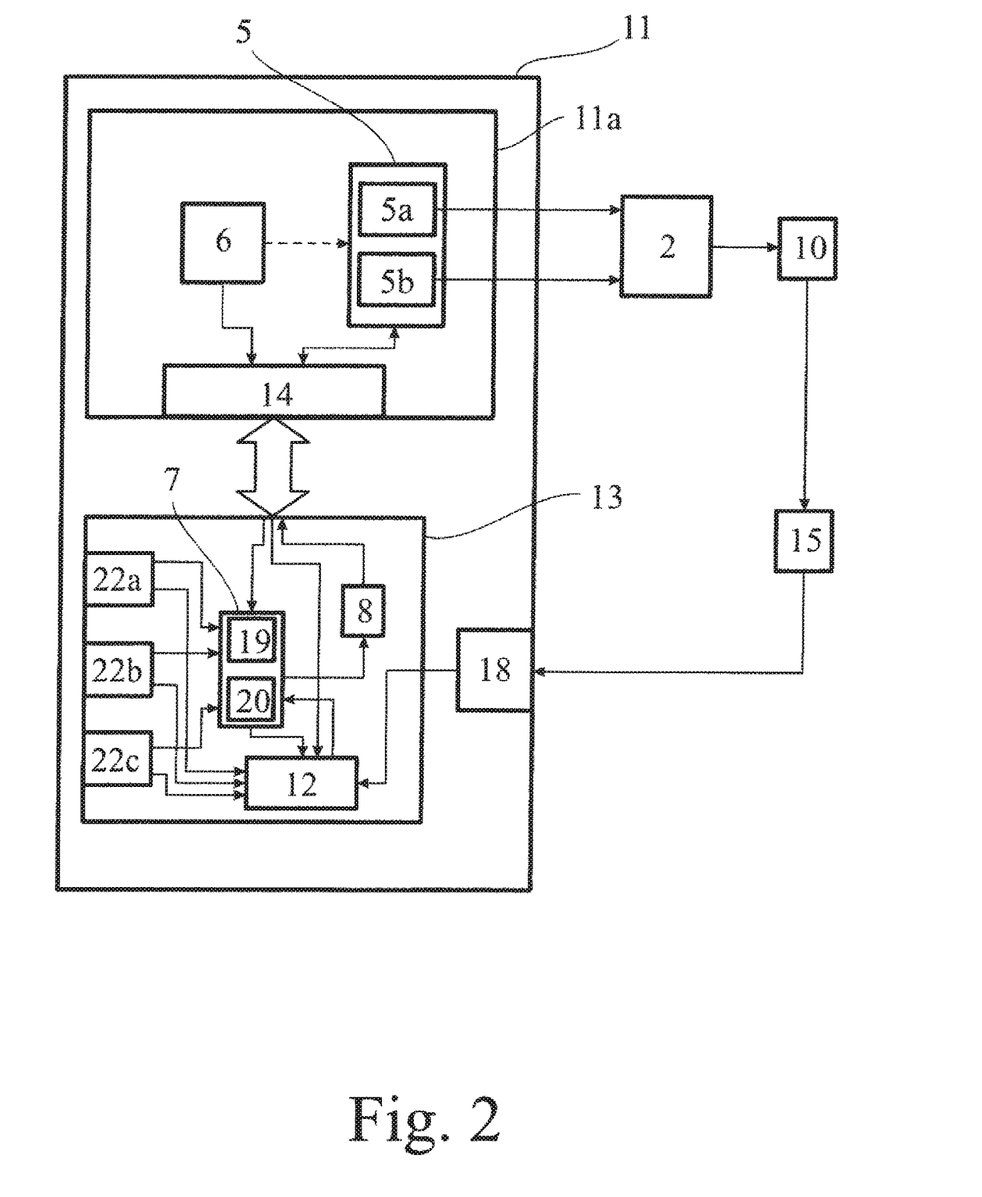
FIG. 2 shows a schematic diagram of the interface between an NC controller and an extension software module for carrying out the method according to the proposal.

In some embodiments, the piece of setpoint position information 5 is generated by an NC controller 11a, based on the command sequence, in particular after an interpolation and/or a transformation. This NC controller 11a may be a separate device or, as depicted in FIG. 2, software which possibly runs with other software on a computing device, here, the control device 11. To be able to carry out the above-described ongoing adjustment during the processing in a particularly re-sponsive manner, the piece of setpoint position information 5 can be generated by the NC controller 11a at an interpolation rate and that the adjustment of the compensation parameter set 7 for reducing the deviation 9 takes place at the interpolation rate. The term "interpolation rate" may be understood to mean the clock period at which the NC controller 11a carries out the interpolation.

It is particularly advantageous if the method according to the proposal may be applied on an NC controller 11a which is already known. This is particularly sim-ple if the NC controller 11a, which is frequently obtained from a third-party ven-dor, has a connection interface 14 for incorporating proprietary software. Therefore, in various embodiments the processing of the piece of setpoint position information 5 using the compensation parameter set 7 related to the piece of setpoint position information 5 for ascertaining the compensation value 8, and the adjustment of the compensation parameter set 7 for reducing the deviation 9, take place in a running extension software module 13, said extension software module 13 communicating in terms of data technology with the NC controller 11a via the connection interface 14 of said NC controller. This connection interface 14 may be a pure programming interface.

In this case, the execution of this extension software module 13 may be under the control of the NC controller 11a, which, for instance, may be provided in that corresponding access points of the extension software module 13 are passed to the NC controller 11*a* as a recall function. In some embodiments, the connection interface 14 calls the extension software module 13 in terms of data technology based on execution events of the NC controller 11*a*. However, the NC controller 11*a* may also trigger actions in the extension software module 13 by means of another mechanism in terms of data technology by, for example, enabling sema-phores. Reciprocally, it can also be provided that the extension software module 13 may call functions of the NC controller 11*a* in terms of data technology via the connection interface 14.

Via this connection interface 14, it may also be made possible for the extension software module 13 to access the required or helpful information for ascertaining the compensation value 8. Thus, the extension software module 13 can receive state information about the manipulator 2, which may in particular comprise the actual position 10 and/or the piece of setpoint position information 5 and/or the setpoint position 6, via the connection interface 14. Alternatively, and as depicted in FIG. 2, the extension software module may also receive the actual position 10 independently of the NC controller 11*a* and thus independently of the connection interface 14.

Optical detection is particularly suitable for reliably determining the actual position 10 of the operating point 1. As shown in FIG. 1, the actual position 10 can be measured via an optical position sensor 15 during the processing of the workpiece 3. In this case, according to the depiction in FIG. 1, a laser tracker 15*a* is particularly suitable, wherein a plurality of laser trackers 15*a* may also be used for measuring the actual position 10. The laser tracker 15*a* targets a reflector 16 on the manipulator 2. The precision of the adjustment of the compensation parameter set 7 may be may be increased by increasing the number of different measurements carried out by the optical position sensor 15. As also depicted in FIG. 1, in some embodiments, the optical position sensor 15 performs a measurement of the actual position 10 at a plurality of processing positions 17 on the workpiece 3, said processing positions 17 being successively controlled by the manipulator 2 for processing via the end effector 4. In FIG. 1, these processing positions 17 are indi-cated by the corresponding position of the reflector 16 at the respective processing position 17.

In such a case, the compensation parameter set 7 may be adjusted based on the correction value 12 from multiple comparisons between the measured actual position 10 and the setpoint position 6. Here, a reference position 17*a* for the optical position sensor 15 is also defined on the workpiece 3. In some embodiments, the optical position sensor 15 is connected in terms of data technology to the NC controller 11*a* and/or to the extension software module 13 via running measuring software 18.

During the determination of the compensation parameter set 7, a differentiation may already be made between, on the one hand, those parameters which, being type-related or design-related, may be viewed as constant, and on the other hand, those parameters which may differ from one manipulator to the other. The former parameters may also be viewed as fixed model parameters which fundamentally define the computational model in general, and the latter parameters may be viewed as parameters which this model then populates with specific values. Thus, in various embodiments, the compensation parameter set 7 comprises an in particular manipulator type-related model parameter set 19, here, corresponding to the former parameters, and a physical data set 20, corresponding to the latter parameters. The physical data set 20 may comprise mass information (i.e., in the sense of a weight), and additionally or alternatively, center of mass information, relating to the manipulator 2. In some embodiments, only the model parameter set 19 is adjusted based on the correction value 12 for reducing the deviation 9.

According to various embodiments, the compensation parameter set 7 is also used to compensate for the influence of a measurable environmental variable on the actual position 10 of the operating point 1. Thus, in addition to the piece of setpoint position information 5, this measured environmental variable is also taken as a basis for the compensation. In this case, the term "environment" is presently to be interpreted broadly and comprises any arbitrary physical variables, in particular also variables occurring and being measurable on or in the manipulator.

Therefore, during the processing of the workpiece 3, at least one environmental variable can be measured, and that the compensation parameter set 7 can comprise an environmental compensation parameter which is related to the respective measured environmental variable, the respective measured environmental variable being processed using said environment compensation parameter for ascertaining the compensation value 8. The measurement of the at least one environmental variable can take place via an environmental sensor arrangement; according to the example of FIG. 1, via a temperature sensor arrangement 21*a*.

Various embodiments provide that the at least one environmental variable comprises a pressure 22*a*. This pressure 22*a* may be a pressure 22*a* acting on the manipulator 2, and here in particular acting on a weight compensation system of the manipulator 2.

According to another embodiment, the at least one environmental variable comprises an actual temperature 22*b*. This actual temperature 22*b* may in particular be an actual temperature 22*b* at the manipulator 2. In this case, this measured actual temperature 22*b* may be due both to warming from the environment and to warming from the operation of the manipulator 2. In some embodiments, the actual temperature 22*b* is thus influenced by ambient heat and by self-heating of the manipulator 2.

One embodiment provides here that the environmental compensation parameter comprises a material-dependent temperature expansion coefficient and/or an in particular axis-related temperature-deflection coefficient and/or an in particular axis-related length parameter. Furthermore, it can be that the environmental compensation parameter is related to the measured actual temperature 22*b*.

Thus, the aforementioned length parameter may comprise a measured, estimated, or calculated length specification, which may relate in particular to a distance between two axes of the manipulator 2. The temperature expansion coefficient may be an expansion coefficient which is related to a material of the manipulator 2. The temperature-deflection coefficient may also relate to a deflection of the path between two axes, analogously to the aforementioned length parameter. The environmental compensation parameter may also comprise a weighting of these individual parameters and coefficients.

An additional embodiment provides that the at least one environmental variable comprises a process force 22*c* acting on the manipulator 2 and/or on the end effector 4. Such a process force 22*c* is to be understood to mean a force which is exerted by the end effector 4 in particular on the workpiece 3 during the processing, said force then also being correspondingly absorbed by the manipulator 2 and, for example, possibly resulting in deflections there.

The manipulator 2 can be a multiaxis robot 23, as depicted in FIG. 1. Correspondingly, in some embodiments the piece of setpoint position information 5 comprises a piece of axis information 5a about the multiaxis robot 23. Such a piece of axis information 5a is thus to be understood to be a piece of information which relates to one or multiple axes of the multiaxis robot 23. In particular, it may be a piece of information about a setpoint position of an axis of the multiaxis robot 23. Specifically, the piece of axis information 5a may comprise a piece of setpoint information about a horizontal main axis of the multiaxis robot 23. The piece of axis information 5a may also specify a setpoint position of all axes of the multiaxis robot 23, so that in this respect, the setpoint position 6 may also be unambiguously defined via such a piece of axis information 5a. In some embodiments, the piece of axis information 5a specifies the setpoint position 6 in the joint coordinates of the multiaxis robot 23.

Furthermore, it can be provided that the compensation parameter set 7 comprises an axis compensation parameter which is related to the piece of axis information 5a, via which the piece of axis information 5a is processed for ascertaining the correction value 12. In other words, the correction value 12 is a function of the piece of axis information 5a. Here, it may in particular be that the piece of axis information 5a, and, in some embodiments, only the piece of axis information 5a, is adjusted via a component of the correction value 12 which derives from the axis compensation parameter. In this respect, the piece of axis information 5a, and specifically the aforementioned piece of setpoint information about the horizontal main axis of the multiaxis robot 23, may be compensated for in a targeted manner via the axis compensation parameter, so that the complexity of the calculations for compensating for the deviation 9 is reduced overall.

According to some embodiments, the piece of setpoint position information 5 comprises a piece of Cartesian coordinate information 5b. In this case, it may be a position specification in Cartesian coordinates which corresponds to the setpoint position 6. Here, it is furthermore provided that the piece of axis information 5a was generated based on the piece of Cartesian coordinate information 5b. This action is also referred to as a backward transformation, whereas the transformation from the joint coordinates to the Cartesian coordinates is referred to as a forward transformation. It can be provided that the compensation parameter set 7 comprises an absolute compensation parameter which is related to the piece of Cartesian coordinate information 5b, via which the piece of Cartesian coordinate information 5b is processed for ascertaining the correction value 12. In this way, a mechanism for compensating for the deviation may thus be provided, which also at least directly takes into account the Cartesian coordinates of the setpoint position 6 or a corresponding portion of the piece of setpoint position information 5. This may possibly mean a reduction in computing cost or complexity versus an approximately exclusive consideration of the joint coordinates in terms of the piece of axis information 5a.

The invention claimed is:

1. A method for compensating for a deviation in an operating point of a manipulator during the processing of a workpiece via an end effector on the manipulator; comprising:
    processing a command sequence for controlling the manipulator for the purpose of processing the workpiece,
    generating setpoint position information corresponding to a setpoint position based on the command sequence, and
    setting the operating point of the manipulator based on said piece of setpoint position information
    wherein the setpoint position information is processed for ascertaining a compensation value using a compensation parameter set which is related to the piece of setpoint position information and the setpoint position information is adjusted according to the compensation value for compensating for a deviation between an actual position of the operating point and the setpoint position,
    wherein the actual position is measured during the processing of the workpiece,
    wherein based on a comparison between the measured actual position and the setpoint position a correction value is ascertained, and
    wherein based on the correction value the compensation parameter set is adjusted during the processing of the workpiece for reducing the deviation.

2. The method as claimed in claim 1, wherein the setpoint position information is generated by an NC controller, based on the command sequence.

3. The method as claimed in claim 2, wherein the processing of the setpoint position information using the compensation parameter set related to the setpoint position information for ascertaining a compensation value and the adjustment of the compensation parameter set for reducing the deviation take place in a running extension software module, the extension software module communicating in terms of data technology with the NC controller via a connection interface of the NC controller.

4. The method as claimed in claim 2, wherein the setpoint position information is generated by the NC controller at an interpolation rate; and wherein the adjustment of the compensation parameter set for reducing the deviation takes place at the interpolation rate.

5. The method as claimed in claim 3, wherein the connection interface calls in terms of data technology the extension software module based on execution events of the NC controller.

6. The method as claimed in claim 3, wherein the extension software module receives state information about the manipulator.

7. The method as claimed in claim 3, wherein during the processing of the workpiece, the actual position is measured via an optical position sensor.

8. The method as claimed in claim 7, wherein the optical position sensor is connected in terms of data technology to the NC controller and/or to the extension software module via running measuring software.

9. The method as claimed in claim 1, wherein the compensation parameter set comprises a manipulator type-related model parameter set and a physical data set, comprising mass information and/or center of mass information relating to the manipulator; and wherein only the model parameter set is adjusted based on the correction value for reducing the deviation.

10. The method as claimed in claim 1, wherein during the processing of the workpiece, at least one environmental variable is measured; and wherein the compensation parameter set comprises an environmental compensation parameter which is related to the respective measured environmental variable, the respective measured environmental variable being processed using the environmental compensation parameter for ascertaining the compensation value.

11. The method as claimed in claim 10, wherein the at least one environmental variable comprises a pressure acting on the manipulator.

12. The method as claimed in claim 10, wherein the at least one environmental variable comprises an actual temperature at the manipulator.

13. The method as claimed in claim 12, wherein the environmental compensation parameter comprises a material-dependent temperature expansion coefficient and/or an axis-related temperature-deflection coefficient and/or an axis-related length parameter; and wherein the environmental compensation parameter is related to the measured actual temperature.

14. The method as claimed in claim 12, wherein the actual temperature is influenced by ambient heat and by self-heating of the manipulator.

15. The method as claimed in claim 10, wherein the at least one environmental variable comprises a process force acting on the manipulator and/or on the end effector.

16. The method as claimed in claim 1, wherein the manipulator is a multiaxis robot.

17. The method as claimed in claim 16, wherein the setpoint position information comprises an axis information about the multiaxis robot.

18. The method as claimed in claim 17, wherein the compensation parameter set comprises an axis compensation parameter which is related to the axis information, via which the axis information is processed for ascertaining the correction value.

19. The method as claimed in claim 18, wherein only the axis information is adjusted via a component of the correction value which derives from the axis compensation parameter.

20. The method as claimed in claim 1, wherein the setpoint position information comprises a Cartesian coordinate system.

* * * * *

UNITED STATES PATENT AND TRADEMARK OFFICE
CERTIFICATE OF CORRECTION

PATENT NO. : 10,409,258 B2
APPLICATION NO. : 15/540633
DATED : September 10, 2019
INVENTOR(S) : Markus Stoyke Page 1 of 1

It is certified that error appears in the above-identified patent and that said Letters Patent is hereby corrected as shown below:

In the Claims

In Claim 1, Column 10, Line 8, please delete "piece of" after --related to the--.

Signed and Sealed this
Twelfth Day of November, 2019

Andrei Iancu
*Director of the United States Patent and Trademark Office*